United States Patent [19]

Stumpp et al.

[11] 4,108,117
[45] Aug. 22, 1978

[54] FUEL METERING SYSTEM

[75] Inventors: Gerhard Stumpp, Stuttgart; Wolf Wessel, Oberriexingen; Volkhard Stein; Wolfgang Ripper, both of Stuttgart, all of Fed. Rep. of Germany

[73] Assignee: Robert Bosch GmbH, Stuttgart, Fed. Rep. of Germany

[21] Appl. No.: 741,642

[22] Filed: Nov. 15, 1976

[30] Foreign Application Priority Data

Dec. 5, 1975 [DE] Fed. Rep. of Germany ....... 2554725

[51] Int. Cl.² .............................................. F02B 3/00
[52] U.S. Cl. .......................... 123/33 A; 123/139 AW; 261/44 A; 261/44 R
[58] Field of Search ........................... 261/44 A, 44 R; 123/139 AW, 33 A

[56] References Cited

U.S. PATENT DOCUMENTS

| | | | |
|---|---|---|---|
| 1,526,318 | 8/1920 | Chandler | 261/DIG. 56 |
| 1,715,453 | 6/1929 | Goddyn | 261/44 R |
| 2,798,705 | 7/1957 | Lawrence, Jr. | 261/44 R |
| 3,777,727 | 12/1973 | Kinchner et al. | 123/139 AW |
| 3,880,125 | 4/1975 | Kawmerer et al. | 123/139 AW |
| 3,972,314 | 8/1976 | DuPont et al. | 123/139 AW |
| 4,034,029 | 7/1977 | Tipton | 261/44 R |

*Primary Examiner*—Charles J. Myhre
*Assistant Examiner*—R. A. Nelli
*Attorney, Agent, or Firm*—Edwin E. Greigg

[57] ABSTRACT

A fuel metering system for an internal combustion engine has an arbitrarily settable throttle plate which controls the air flow through the induction tube and an air flow responsive valve element, shaped somewhat like a cylindrical sector, which is pivoted inside the induction tube upstream of the throttle plate. The pivoting valve element has a shaft which is surrounded by a bushing. An opening in the bushing is uncovered to varying extent by a control edge on the pivotal shaft so as to meter out fuel in proportion to the angular excursion of the pivoting valve element. The fuel is delivered to the induction tube directly downstream of the pivoting valve element.

23 Claims, 12 Drawing Figures

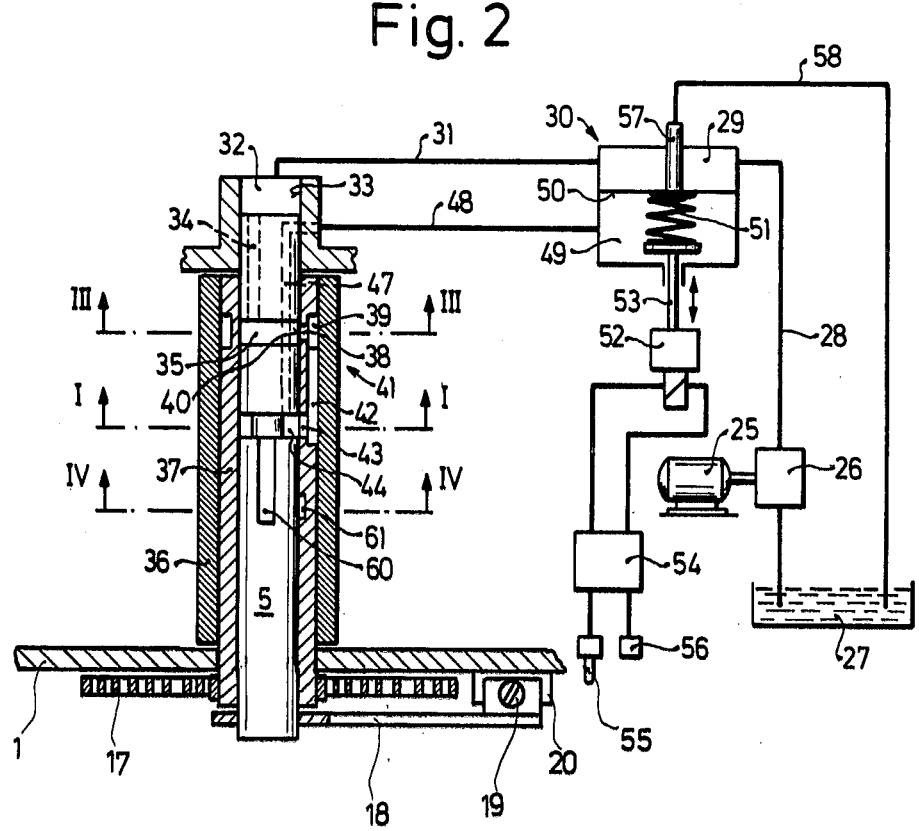
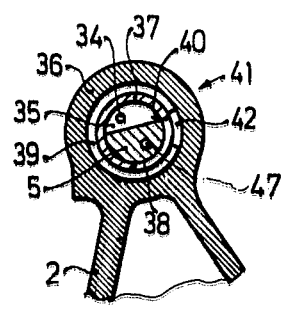
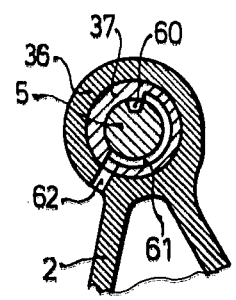

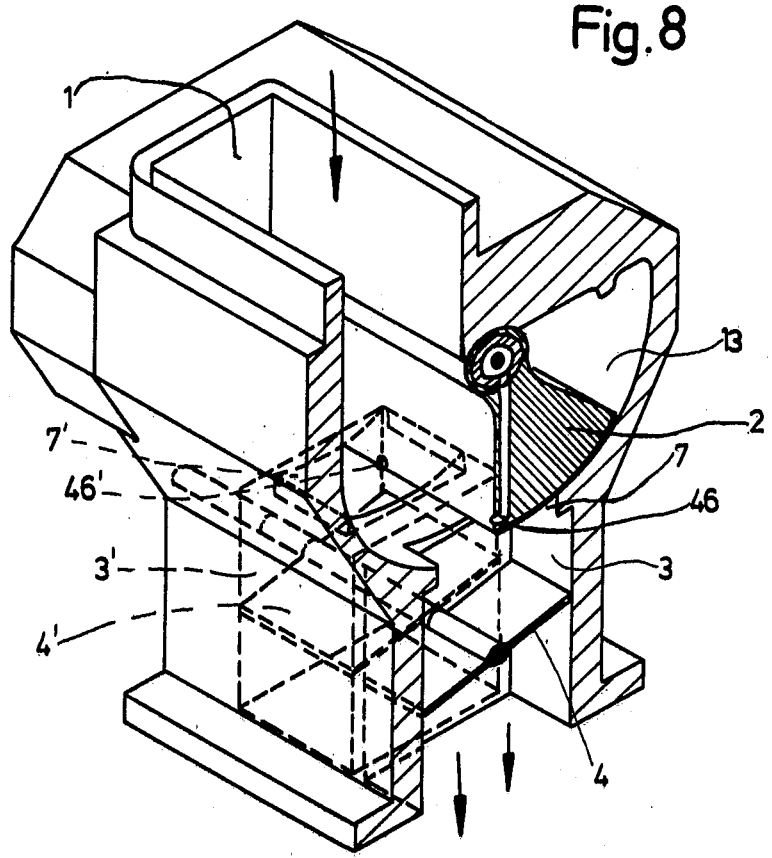

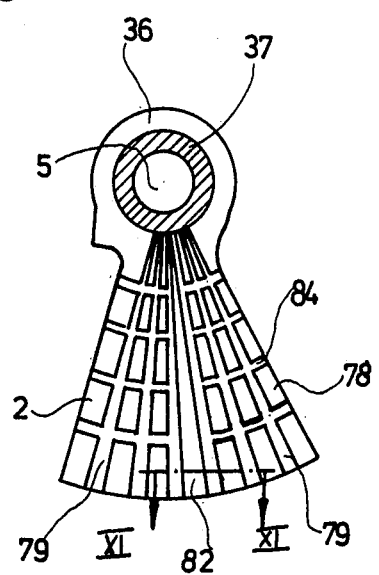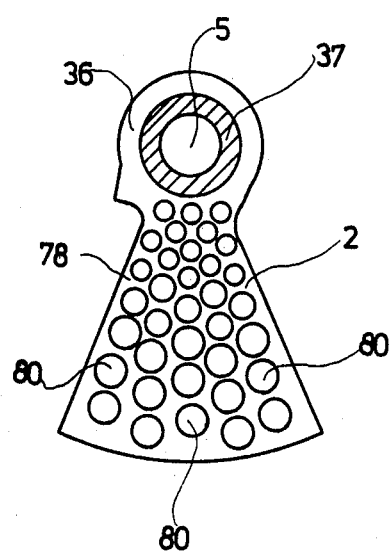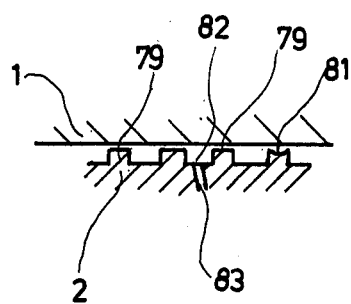

FUEL METERING SYSTEM

BACKGROUND OF THE INVENTION

The invention relates to a fuel injection system for mixture compressing, externally ignited internal combustion engines. The type of engine to which this invention especially relates has an injection location in the air induction manifold which also includes an air flow measuring member as well as an arbitrarily actuatable throttle valve. The air flow rate meter may be displaced depending on the quantity of air flowing through the induction tube and it is subjected to a restoring force. During its displacement, the air measuring member controls a fuel metering system to meter out fuel in proportion to the air flow.

Fuel injection systems of this type are employed to obtain an automatic favorable adjustment of fuel-air mixture for all operational conditions of the engine so as to obtain complete combustion of fuel and the highest power or lowest fuel consumption. In addition, the concentration of toxic components in the exhaust gas is sharply reduced or entirely absent. This type of control requires that the fuel quantity be metered out very precisely according to the engine requirements.

In known fuel injection systems of this general type, the air quantity flowing through the induction tube is measured by an air flow rate meter and fuel is metered out proportional to the air quantity separately for each engine cylinder and is injected separately by individual injection valves in the vicinity of each cylinder. An embodiment of this type of fuel injection system is very expensive and complicated.

OBJECT AND SUMMARY OF THE INVENTION

It is a principal object of this invention to provide a fuel injection system similar to the known type but involving substantially lower constructional costs and providing a substantially improved fuel-air mixture while fulfilling the above-cited requirements made of such a fuel injection system.

This and other objects are attained according to the invention by providing that the air flow rate meter is a valve element having a radial cross section resembling a circular sector and extending throughout the diameter of the air induction tube. The air flow meter is pivoted at one side and its surface facing the air stream has an edge that defines the free opening within an aperture of the induction tube. The surface of the valve element facing away from the air stream experiences the induction tube pressure downstream of the aperture. Cooperating parts of the bearing and bearing shaft of the pivoting valve element serve to meter out fuel which is then delivered to the vicinity of the control edge of the valve element for injection into the air induction tube.

In a favorable embodiment of the invention, the aperture which limits the air induction cross section is defined by a foil having a substantially rectangular opening and the change in circumference in the opening in the foil changes the fuel-air mixture.

Another favorable feature of the invention provides that the surface of the valve element facing away from the air stream extends into a damping chamber which is coupled via a throttle with a region of the induction tube downstream of the flow aperture.

Another favorable feature of the invention provides that the flow aperture is actually located in the end face of the valve element upstream of the point of injection.

A preferred embodiment of the invention provides that the induction tube region downstream of the valve element is divided into axially separate regions and that each such region has a separate throttle valve, a separate point of injection and a separate air flow aperture.

A further advantageous embodiment of the invention provides that the seal between the induction tube walls and the surfaces of the valve element facing those walls is a labyrinth seal formed by radial fences disposed concentrically at the side walls of the valve element with a groove connecting the region between two radially extending fences with the induction tube downstream of the valve element.

The invention will be better understood as well as further objects and advantages and embodiments thereof become more apparent from the ensuing detailed description of exemplary preferred embodiments taken in conjunction with the drawing.

BRIEF DESCRIPTION OF THE DRAWING

FIG. 2 is a section along the line II-II in FIG. 1;

FIG. 3 is a section of the fuel injection system along the line III-III in FIG. 2;

FIG. 4 is a section along the line IV—IV in FIG. 2;

FIG. 8 illustrates a fourth exemplary embodiment of the invention;

FIG. 9 illustrates a valve element according to the invention including a labyrinth seal;

FIG. 10 is an illustration similar to FIG. 9; and

FIG. 11 is a section of FIG. 1 along the line XI—XI.

DESCRIPTION OF THE PREFERRED EMBODIMENTS

Figure 1:
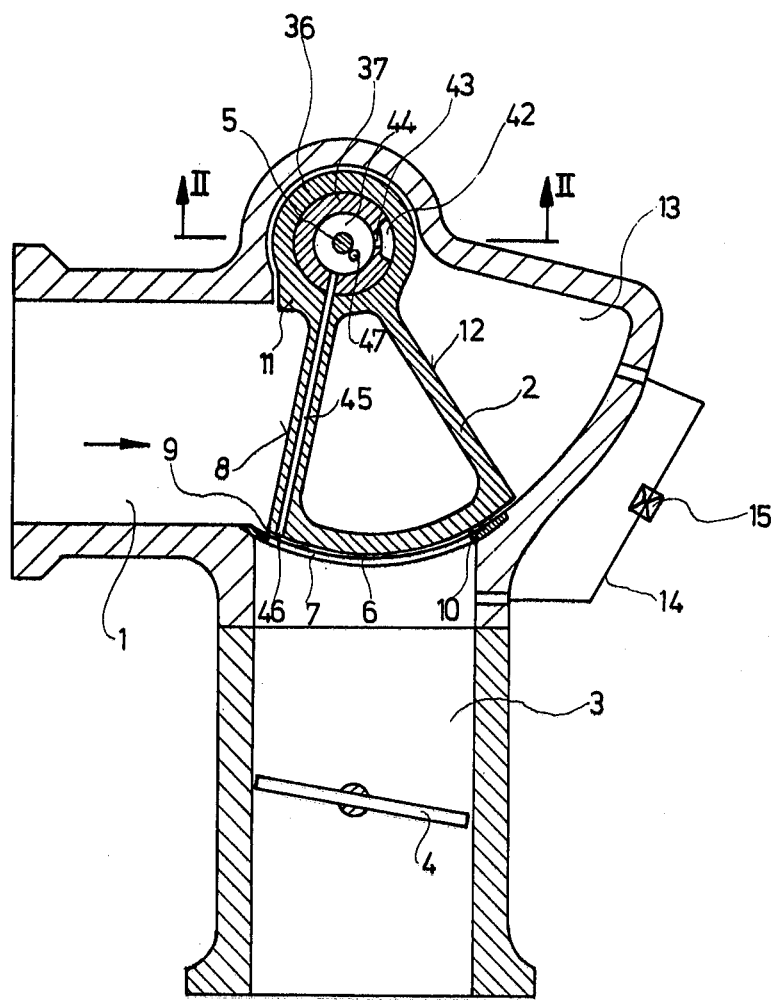
FIG. 1 is a cross section through a first exemplary embodiment of a fuel injection system according to the line I—I of FIG. 2.

Turning now to FIG. 1, there is shown a fuel injection system with parts of an engine in which the air necessary for combustion flows in the direction of the arrow into a region 1 of the induction tube which encloses an air flow rate responsive element 2. The air then traverses a region 3 of the induction tube which encloses an arbitrarily settable throttle valve 4 and finally continues to one or several cylinders, not shown, of an internal combustion engine. The air flow element 2 is pivoted at one side about a transverse fixed shaft 5 and is embodied as a valve element which has the radial cross section of a circular sector and which completely traverses the inside diameter of the induction tube. The face 6 of the valve element 2 cooperates with and passes an aperture 7. It is advantageous for reasons of weight and cost savings if the valve element 2 is hollow.

The surface 8 of the valve element 2 facing the air stream has an edge 9 which controls the degree of opening in the aperture 7 in dependence on the aspirated air quantity. The aperture 7 is preferably disposed within a foil 10. The region 1 of the induction tube is entirely traversed with tight radial clearance by the valve element 2. A stop 11 limits the clockwise rotation of the valve element 2. The surface 12 of the valve element 2 remote from the air stream enters a damping chamber 13 which is coupled via a line 14 containing a throttle 15 with the induction tube region 3 downstream of the aperture 7. As a result, any pressure oscillations which are due to the suction strokes of the engine do not have any influence on the angular position of the valve element 2. The motion of the valve element 2 within the appropriately shaped air induction tube region 1 takes place in approximation to a linear function of the air flow rate in the induction tube. If the pressure ahead of the valve element 2 is constant, then the pressure between the valve element 2 and the throttle valve 4 is also constant.

Turning now to FIG. 2, it will be seen that fuel is supplied to the system by an electric motor 25 which drives a fuel pump 26 that aspirates fuel from a fuel container 27 and delivers it via a line 28 to a chamber 29 within a differential pressure valve 30. From the chamber 29, fuel flows through a line 31 into a chamber 32 which is defined by the end face of the bearing shaft 5 and its guide bore 33 in an extension of the induction tube wall. A bore 34, shown in broken lines in FIG. 2, establishes communication of the chamber 32 with a groove 35 worked into the bearing shaft 4. The valve element 2 is affixed on a sleeve 36 which is fixedly attached to a bushing 37 rotating on the bearing shaft 5. The bushing 37 has a control slot 38 terminating in an annular groove 39. The control slot 38 cooperates with a control edge 40 (see FIG. 3) which is formed by the end surface of the groove 35 in the bearing shaft. Depending on the position of the valve element 2, the control edge 40 opens the control slot 38 to varying degrees for metering out a fuel quantity proportional to the aspirated air flow rate. Thus, the control edge 40 and the control slot 38 together form a fuel metering valve 41 within the bearing shaft 5 of the valve element 2. The metered fuel flows from the annular groove 39 through a groove 44 in the bearing shaft 5. The annular groove 44 communicates with a line 45 disposed within the face portion of the valve element 2 and the line 45 opens in the vicinity of the aperture-controlling edge 9, e.g., at the end-face of the valve element 2, through an injection nozzle 46, into the portion of the passage 7 opened by the edge 9, as best seen in FIG. 1. In a variant embodiment, which is not illustrated, the line 45 might terminate in several nozzles 46 located in the end surface of the valve element 2. As another variant, the injection nozzle 46 might be a slit extending nearly over the entire width of the end surface of the valve element 2. In yet another embodiment, not illustrated, the injection nozzle 46 might be a fuel injection valve.

Fuel is metered out at the metering valve 41 with constant pressure difference. For this purpose, the annular groove 44 communicates through a bore 47 and a line 48 with a chamber 49 in the differential pressure valve 30 which is separated by a diaphragm 50 from the chamber 29. The differential pressure valve 30 is urged to close by a spring 51 within the chamber 49. The force of the spring 51 may be changed in dependence on operational parameters of the engine. For this purpose, an electromagnet 52 may, for example, be employed, which engages the spring 51 via an actuating pin 53, or, again, a supplementary force whose magnitude depends on engine variables may act directly on the diaphragm 50 in parallel with the spring 51. For example, the magnet 52 may be actuated by an electronic controller 54, in response to signals from an oxygen sensor 55 located in the exhaust line to measure the partial pressure of oxygen or from a temperature sensor 56. The force on the diaphragm 50 might also be made dependent on a bimetallic spring which engages the spring with a force depending on the engine temperature. The differential pressure valve 30 is embodied as a flat seat valve whose diaphragm 50 is its movable valve member which cooperates with a fixed valve seat 57 over which fuel may flow into a return line 58 which terminates in the fuel container 27. The differential pressure valve serves at the same time as a system pressure control valve. The excursion of the valve element 2 takes place in opposition to the force of a spiral spring 17, one end of which is connected to the bushing 37 while the other end is attached to a stop member on the air induction tube.

The basic setting of the fuel metering valve 41 may be adjusted by rotating the bearing shaft 5 with respect to the valve element 2 by means of a lever 18 and a screw 19 abutting a stop 20.

A favorable feature of the invention is that the metered-out fuel is mixed with air prior to injection in the air induction tube. For this purpose, as shown more clearly in FIG. 4, the annular groove 44 communicates with an air hole 62 in the face 8 via a groove 60 and an annular groove 61. The air hole 62 leads to the interior of the air induction tube 1 upstream of the valve element 2. The annular groove 61 is preferably so embodied that it covers the groove 60 only when the engine runs at least at minimum idling rpm. This feature prevents the admission of an incombustible fuel-air mixture during engine start up. The same purpose could be achieved by placing the terminus of the injection nozzle 46 a small distance upstream of the edge 9 or by placing it so as to be very close to the induction tube wall. The admixture of air to the metered fuel prior to injection in the induction tube results in an improved mixture preparation.

Figure 2A:
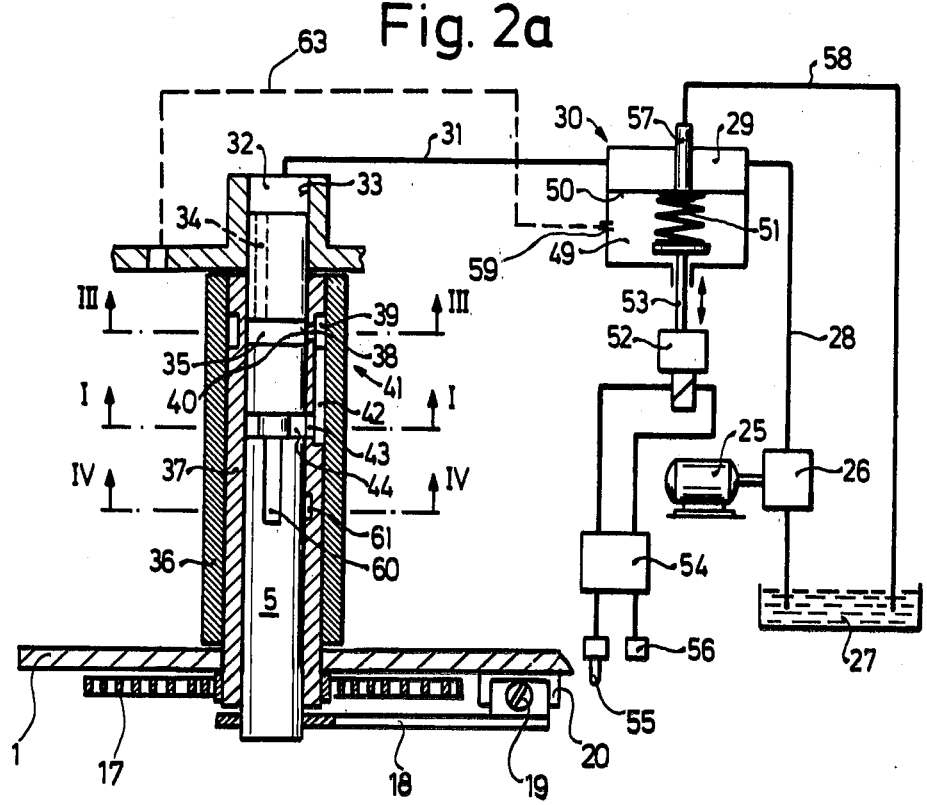
FIG. 2a is an illustration similar to FIG. 2.

A special advantage deriving from the communication of the control slit 38 of the metering valve 41 via the annular groove 39, the groove 42, the annular groove 44, the groove 60 and the annular groove 61 with the opening 62 terminating in the induction tube upstream of the valve element and located in the lateral surface 8 thereof is, according to FIG. 2a, that the chamber 49 of the differential pressure valve 30 can be connected via an air opening 59 and a line 63, shown dotted, with the induction tube region 1 upstream of the valve element 2. As a consequence, the bore 47 and the line 48 in FIG. 2 which transmit the counter-pressure to the metering location 38, 40 into chamber 49 may be dispensed with because the counter-pressure which is experienced at the metering location downstream of the control edge 40 via the opening 62 is the same as the pressure which is effective in the chamber 49 and which acts on the diaphragm 50. In the embodiment of FIG. 2a, as already described with respect to FIG. 2, the change of the differential pressure at the metering location 38, 40 may take place by changing the closing force of the diaphragm 50 in dependence on operational variables of the engine. Thus, in the embodiment of FIG. 2, by placing the induction tube pressure upstream of the valve element at the metering location 38, 40 as a counter-pressure, there derives firstly the advantage of a treatment of the metered-out fuel with air and the further advantages that one may use an open injection nozzle 46 and that the constant differential pressure across the metering location 38, 40 may be obtained with simplified means.

The above-described fuel injection system according to the present invention operates as follows:

When the engine is running, the fuel pump 26 aspirates fuel from the container 27 and delivers it through the line 28 to the fuel metering valve assembly 41. At the same time, the engine aspirates air which flows through the induction tube 1 and the flow aperture 6. Depending on the displacement of the valve element 2, the control edge 9 more or less opens the aperture 7. Since the fuel metering valve 41 is controlled directly by the position of the valve element 2, the ratio of aspirated air and metered-out fuel is substantially constant. Furthermore, the fuel metering takes place at a pressure difference which is held constant by the differential pressure valve 30, while closing force exerted on the diaphragm 50, especially by the force of the spring 51 and, hence, the pressure difference, may be changed so as to adapt the fuel-air ratio to different operational conditions of the engine. The metered-out fuel is injected through the injection nozzle 46 located at the end face of the valve element 2 near the control edge 9, e.g., near a point where the air flow has its highest velocity, so as to obtain as homogeneous a fuel-air mixture as possible.

The fuel injection system according to the present invention provides the advantage that the location of the fuel metering assembly 41 in the bearing shaft 5 makes possible a very compact construction and, furthermore, since the fuel injection occurs through the end face of the valve element 2 near the control edge 9, all fuel lines may be made very short and a very good mixture integration is obtained. Yet another improvement of the fuel mixture preparation results from admixing air with the metered-out fuel prior to injection in the induction tube.

The air flow meter embodied as a rotating valve element offers the advantage of being very stable mechanically and relatively immune against high pressure surges, for example back-fires. Furthermore, the wettable surface area when closed is less than in a comparable air metering flap with a damper baffle. Another particular advantage is that the rotary valve element cooperates with an aperture in a foil that is easily exchanged so as to be adaptable to any particular type of engine.

Figure 5:
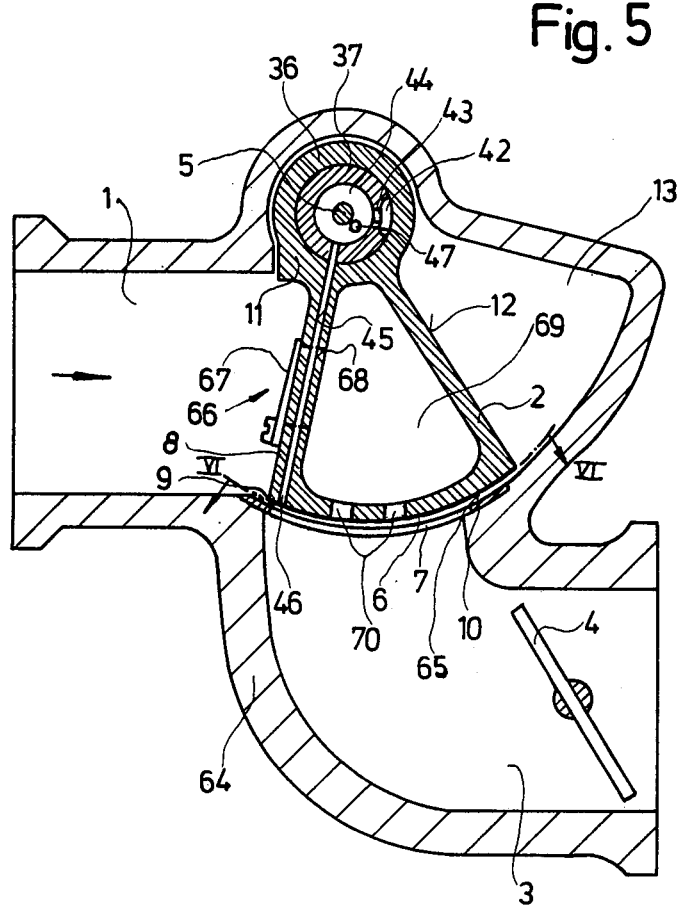
FIG. 5 is an illustration of a second exemplary embodiment of a fuel injection system according to the invention.

In the second exemplary embodiment of the invention as illustrated in FIG. 5, elements identical with the embodiments of the previous figures retain the same reference numerals. The main difference between the second exemplary embodiment according to FIG. 5 and that of FIG. 1 is the presence of an induction tube elbow 64 which connects two parallel induction tube regions 1 and 3. Due to the presence of the elbow 64, the fuel injected for conditions of high air flow has to travel farther to reach an induction tube wall than would have been case in the first exemplary embodiment. Furthermore, in the example of FIG. 5, a gap 65 between the end face 6 of the valve element 2 and the foil 10 serves as a damping throttle between the induction tube region downstream of the valve element 2 and the damping chamber 13. In order to protect the system against damage from, for example, back-fires in the induction tube, it might be suitable to dispose a check valve 66, for example at the face 8 of the valve element 2, which opens under air flow opposite to the normal direction and which may be for example a leaf spring 67 which cooperates with an opening 68 in the wall leading to the hollow space 69 within the valve element 2. The hollow space 69 communicates through openings 70 with the induction tube region 3 downstream of the valve element. The leaf spring 67 opens the aperture 68 only when the pressure downstream of the valve element increases substantially due to back-fires.

Figure 6:
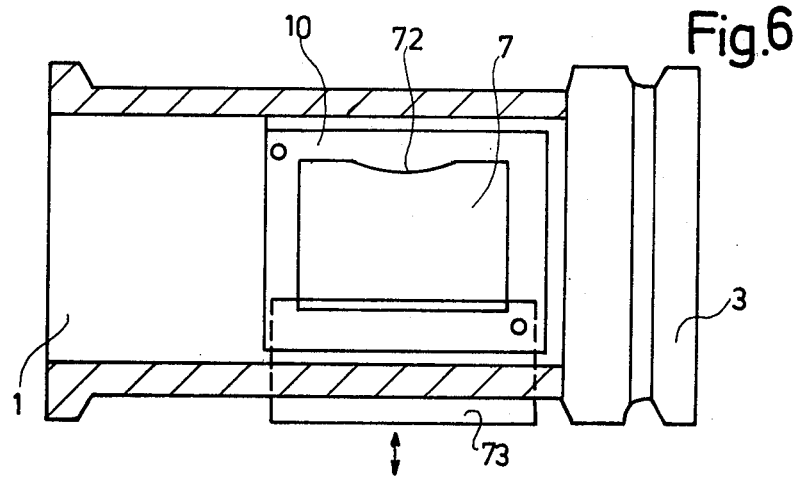
FIG. 6 is a section through the system of FIG. 5 along the line VI—VI.

FIG. 6 is a top view of an aperture foil 10 with a rectangular opening 7 whose contour is shaped in a special manner in a region 72. This kind of shaping permits making the fuel-air ratio depend on the air throughput. The fuel-air ratio can also be changed by covering the opening 7 with a correction foil 73 to varying degrees. The correction foil 73 can be displaced as a function of engine variables and by means of an electromagnet 52 as illustrated in FIG. 2. Thus, for example, the fuel-air mixture could be enriched during engine warm-up by displacing the correction foil so as to diminish the free aperture of the opening 7.

Figure 7:
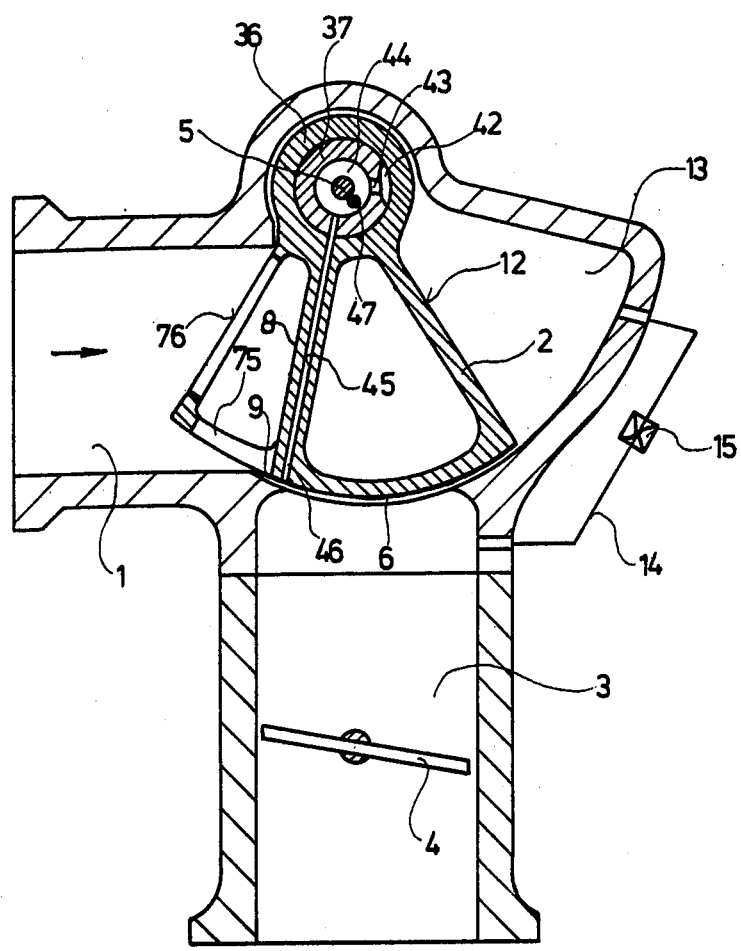
FIG. 7 illustrates a third exemplary embodiment of a fuel injection system according to the invention.

The third exemplary embodiment of the invention illustrated in FIG. 7 shows an opening 75 in the end face 6 of the valve element located upstream of the point of injection 46. Depending on the position of the valve element 2, the control edge 9 reveals a greater or smaller amount of opening leading to the induction tube region 3 by altering the gap between one edge of the induction tube and the control edge 9. To provide support for the part of the valve element which includes the metering aperture 75, the valve element may be provided with a perforated wall portion 76. The placement of the metering aperture 75 in the valve element 2 offers the advantage that the same basic housing, i.e., the induction tube region 1, may be used for a multitude of internal combustion engines and the adaptation to particular engine requirements is then made by installing the appropriate valve element 2.

FIG. 8 illustrates a fourth exemplary embodiment of the fuel injection system according to the invention wherein the induction tube region downstream of the rotatable valve element 2 is divided into axially separate sections 3, 3' each having a throttle plate 4, 4', respectively, and an injection point 46, 46', respectively, as well as metering apertures 7, 7', respectively. A division of the induction tube in this manner is useful, for example, when the system is used for V-type engines. In order to improve the seal between the induction tube walls and the adjacent side walls of the valve element, it may be suitable to embody the side walls of the valve element or of the induction tube as labyrinth seals. As illustrated in FIG. 9, these may be formed by radial and concentric fences 79 and 84 disposed at the side walls of the valve element or, alternatively, they may be embodied as bores 80 which form a system of throttling locations disposed in series which tend to reduce the leakage of air to a substantial degree.

FIG. 11 is an enlarged illustration of a section of the side wall 78 of the valve element including the fences 79 used for additional sealing. The fences may have a rectangular cross section, or the faces adjacent the induction tube walls may be concave, as illustrated at numeral 81, or pointed. In order to reduce the pressure drop between the induction tube region 1 upstream of the valve element and the damping chamber, it might be suitable to provide a groove 82 between two fences 79 and to connect the groove 82 by a line 83 with the induction tube region 3 downstream of the valve element 2. Alternatively, and as not shown, the groove 82 and the line 83 can be disposed within the induction tube wall region passed by the valve element 2.

The foregoing relates to preferred exemplary embodiments of the invention, it being understood that other embodiments and variants are possible within the spirit and scope of the invention, the latter being defined by the appended claims.

What is claimed is:

1. In a fuel injection system which includes an air flow responsive member located substantially within the induction tube and further includes fuel metering means, coupled to said air flow responsive member, said induction tube further containing an arbitrarily controlled throttle, the improvement comprising:

air flow aperture means in said induction tube upstream of said throttle;

said air flow responsive member is disposed upstream of said aperture means and is a movable valve element whose cross section in a plane parallel to the air flow is substantially a sector of a circle, said sector defining a narrow end, an arc-shaped wide end, and side walls therebetween, said valve element being disposed to pivot at its narrow end about a shaft lying adjacent to one side of the induction tube, such that one of said side walls is substantially perpendicular to the incoming air flow and its edge adjacent to said arc shaped end cooperates with said aperture means to thereby define a variable free flow cross section for air through said induction tube; and said fuel metering means is located in and around the pivotal shaft of said valve element and fuel is metered thereby as a function of the pivotal position of said valve element and is delivered to the induction tube in the immediate vicinity of said edge of said valve element.

2. A fuel injection system as defined by claim 1, wherein said aperture means in said induction tube is a metal foil containing a defined opening.

3. A fuel injection system as defined by claim 2, wherein said defined opening in said metal foil is substantially rectangular.

4. A fuel injection system as defined by claim 3, wherein the periphery of said defined opening is variable for changing the fuel-air ratio of the engine.

5. A fuel injection system as defined by claim 3, wherein the width of said defined opening is variable for changing the fuel-air ratio.

6. A fuel injection system as defined by claim 1, wherein said induction tube includes a damping chamber for receiving said valve element during displacements by the air flow and includes a damping throttle located in the communicating path between said damping chamber and the induction tube downstream of said defined opening.

7. A fuel injection system as defined by claim 6, wherein said damping throttle is the gap between the end face of said valve element and said metal foil.

8. A fuel injection system as defined by claim 1, further including check valve means disposed on said valve element for opening in a direction opposed to the normal air flow through said induction tube.

9. A fuel injection system as defined by claim 1, wherein said aperture means is a defined opening in the end face of said valve element and wherein the point of injection of fuel is located downstream of said defined opening.

10. A fuel injection system as defined by claim 1, wherein the induction tube region immediately downstream of said valve element is divided into axially separate channels each having a throttle valve, a point of injection and aperture means.

11. A fuel injection system as defined by claim 1, wherein the side wall portions of said valve element are provided with labyrinth seals for reducing air leakage between said wall portions and the interior of said induction tube.

12. A fuel injection system as defined by claim 11, wherein said labyrinth seal is provided by radial concentric fences disposed on the side wall portions of said valve element.

13. A fuel injection system as defined by claim 12, wherein the end faces of said fences are concave with respect to the interior of said induction tube.

14. A fuel injection system as defined by claim 12, further comprising groove means disposed between every two of said fences, said groove means communicating with an induction tube region downstream of said valve element.

15. A fuel injection system as defined by claim 12, wherein said labyrinth seal includes bored depressions in the side walls of said valve element and low fences provided in between said bored depressions.

16. A fuel injection system as defined by claim 1, the improvement further comprising differential pressure valve means connected to said fuel metering means for maintaining constant the pressure difference thereacross.

17. A fuel injection system as defined by claim 16, wherein the pivotal shaft of said valve element has a control edge and wherein said fuel metering means includes a bushing rotatable on and around said shaft, said bushing being provided with a control slit in its wall cooperating with said control edge on said shaft.

18. A fuel injection system as defined by claim 17, the improvement further comprising air hole means in said valve element for admitting air from the induction tube upstream of said valve element to the fuel prior to delivery to said induction tube.

19. A fuel injection system as defined by claim 18, wherein said air hole is so located as to be obturated when the engine is being started.

20. A fuel injection system as defined by claim 16, wherein said differential pressure valve is a flat seat valve having a diaphragm acting as movable valve member, said diaphragm being engaged by fuel pressure upstream of said metering valve on one of its surfaces and by fuel pressure downstream of said metering valve and the force of a spring on its other surface.

21. A fuel injection system as defined by claim 20, further comprising means for altering the force of said spring and said differential pressure valve in dependence on operational variables of the engine.

22. A fuel injection system as defined by claim 21, wherein said differential pressure valve is connected to define the overall fuel pressure in said fuel injection system.

23. A fuel injection system as defined by claim 1, further comprising a differential pressure valve for maintaining constant the pressure across said fuel metering means, the improvement further comprising an air hole in said valve element and terminating in the upstream region of said air induction tube for providing counter-pressure to said fuel metering means from the pressure prevailing there and wherein said differential pressure valve is a flat seat valve having a diaphragm as its movable valve member, one side of said diaphragm being engaged by fuel pressure upstream of said metering valve while the other side of said diaphragm is engaged by induction tube pressure upstream of said valve element as well as by the force of a spring.

* * * * *